United States Patent
Jackson

(10) Patent No.: US 6,252,496 B1
(45) Date of Patent: Jun. 26, 2001

(54) ANIMAL WARNING ALARM DEVICE

(76) Inventor: Otto V. Jackson, 745 Aurora Lake Rd., Aurora, OH (US) 44202

( * ) Notice: Subject to any disclaimer, the term of this patent is extended or adjusted under 35 U.S.C. 154(b) by 0 days.

(21) Appl. No.: 09/393,572

(22) Filed: Sep. 10, 1999

(51) Int. Cl.$^7$ ...................................................... G08B 3/00
(52) U.S. Cl. ................................ 340/384.73; 340/384.2; 340/573.2; 119/174; 119/719
(58) Field of Search ...................... 340/384.73, 384.2, 340/573.1, 573.2, 404.1, 384.1; 116/137 R, 22 A, 137 A; 119/174, 719; 367/138, 139

(56) References Cited

U.S. PATENT DOCUMENTS

| | | | |
|---|---|---|---|
| 3,412,394 | * 11/1968 | Lewis et al. | 340/573.1 |
| 3,516,384 | * 6/1970 | Will | 340/573.1 |
| 3,890,612 | 6/1975 | Sweany et al. . | |
| 4,091,383 | * 5/1978 | Rainville | 340/384.1 |
| 4,104,610 | 8/1978 | Inoue et al. . | |
| 4,437,428 | 3/1984 | Hoffelner . | |
| 4,725,993 | * 2/1988 | Owen et al. | 340/384.1 |
| 4,903,630 | 2/1990 | Rezmer . | |
| 4,998,091 | 3/1991 | Rezmer . | |
| 5,214,411 | * 5/1993 | Herbruck | 340/573.1 |
| 5,418,518 | * 5/1995 | Schenken et al. | 340/573.1 |
| 5,588,684 | * 12/1996 | Kiefer | 285/62 |
| 5,602,523 | * 2/1997 | Tyurchioe et al. | 340/384.2 |
| 5,681,034 | * 10/1997 | Noniewicz | 269/139 |
| 5,969,593 | * 10/1999 | Will | 340/384.2 |

* cited by examiner

Primary Examiner—Nina Tong
(74) Attorney, Agent, or Firm—Renner, Otto, Boisselle & Sklar, LLP

(57) ABSTRACT

An animal warning alarm device includes a housing having a hollow tube projecting forwardly therefrom and an electronic sonic generator attached to the housing for providing a sonic wave that is channeled out through the forward open end of the tube which is angled downwardly in a forward direction preferably at an angle of approximately 45° to the road surface beneath the vehicle, whereby the sonic wave that is emitted from the tube will be reflected off the road surface and produce a virtual sonic echo effect.

22 Claims, 2 Drawing Sheets

ANIMAL WARNING ALARM DEVICE

FIELD OF THE INVENTION

This invention relates generally to an animal warning alarm device for mounting on a vehicle to warn deer and other animals that the vehicle is approaching.

BACKGROUND OF THE INVENTION

The number of collisions that occur every year between vehicles and animals in high risk areas and on open roadways is significant. To reduce the risk of hazardous animal/vehicle collisions, vehicle mounted warning alarm devices of various types including both wind activated alarms and ultrasonic alarms have met with varying degrees of success.

A major drawback to wind activated alarms is that the signals they emit vary in strength and frequency with variations in wind speed and direction and vehicle speed.

Electrically powered ultrasonic alarms will produce sound at a constant frequency regardless of wind velocity and direction or vehicle speed. However, the sound waves that they generate may not carry far enough to adequately alert most animals to the approaching vehicle.

SUMMARY OF THE INVENTION

The present invention relates to an animal warning alarm device for mounting on a vehicle that produces a high pitched, semi-directional sonic wave that will carry a sufficient distance to adequately alert deer and most other animals of the approaching vehicle at virtually any speed, thereby greatly reducing the risk of hazardous animal/vehicle collisions.

In accordance with one aspect of the invention, the device produces a sonic wave that is channeled out through the forward open end of a tube that is angled downwardly in a forward direction relative to the vehicle toward the road surface, preferably at a 45° angle, to cause the sonic wave to be reflected from the road surface, producing a virtual sonic echo effect.

In accordance with another aspect of the invention, the tube has a straight walled passage for channeling the sonic wave outwardly through the tube.

In accordance with another aspect of the invention, the device includes a housing having a front wall from which the tube projects, and a rear wall containing a stepped bore within the housing in coaxial alignment with the passage in the tube containing a sonic generator.

In accordance with another aspect of the invention, the sonic generator has a forwardly facing sound discharge opening in coaxial alignment with the passage in the tube.

In accordance with another aspect of the invention, the device includes a chamber forwardly of the sonic generator containing an acoustical foam layer to prevent any particles in the air from passing through the tube into contact with the sonic generator.

In accordance with another aspect of the invention, the device includes a mounting bracket adapted to be fixed to a mounting surface on the vehicle, and the housing has an adjustable pivotal connection with the mounting bracket to permit the housing to be pivoted up or down relative to the mounting bracket to adjust the downward angle of the tube relative to the road surface.

In accordance with another aspect of the invention, the housing has a flange on one side including a flat bottom wall which is engaged by one leg of an L-shaped base bracket and a flat side wall extending at a right angle to the bottom wall which is engaged by another leg of the base bracket, and a bolt extends upwardly through aligned holes in the one leg of the base bracket and the flange, and a nut is threaded onto an upwardly protruding end of the bolt for securing the housing to the base bracket.

In accordance with another aspect of the invention, the mounting bracket has a first leg adjustably pivotally connected to the one leg of the base bracket rearwardly of the housing and a second leg extending at a right angle to the first leg.

In accordance with another aspect of the invention, the base bracket and mounting bracket are made of metal, and the upper end of the bolt that secures the base bracket to the housing flange provides a ground terminal for a ground wire coming off the sonic generator.

In accordance with another aspect of the invention, a power lead wire coming off the sonic generator is connected to a dash mounted control switch powered off a fused circuit of the vehicle.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
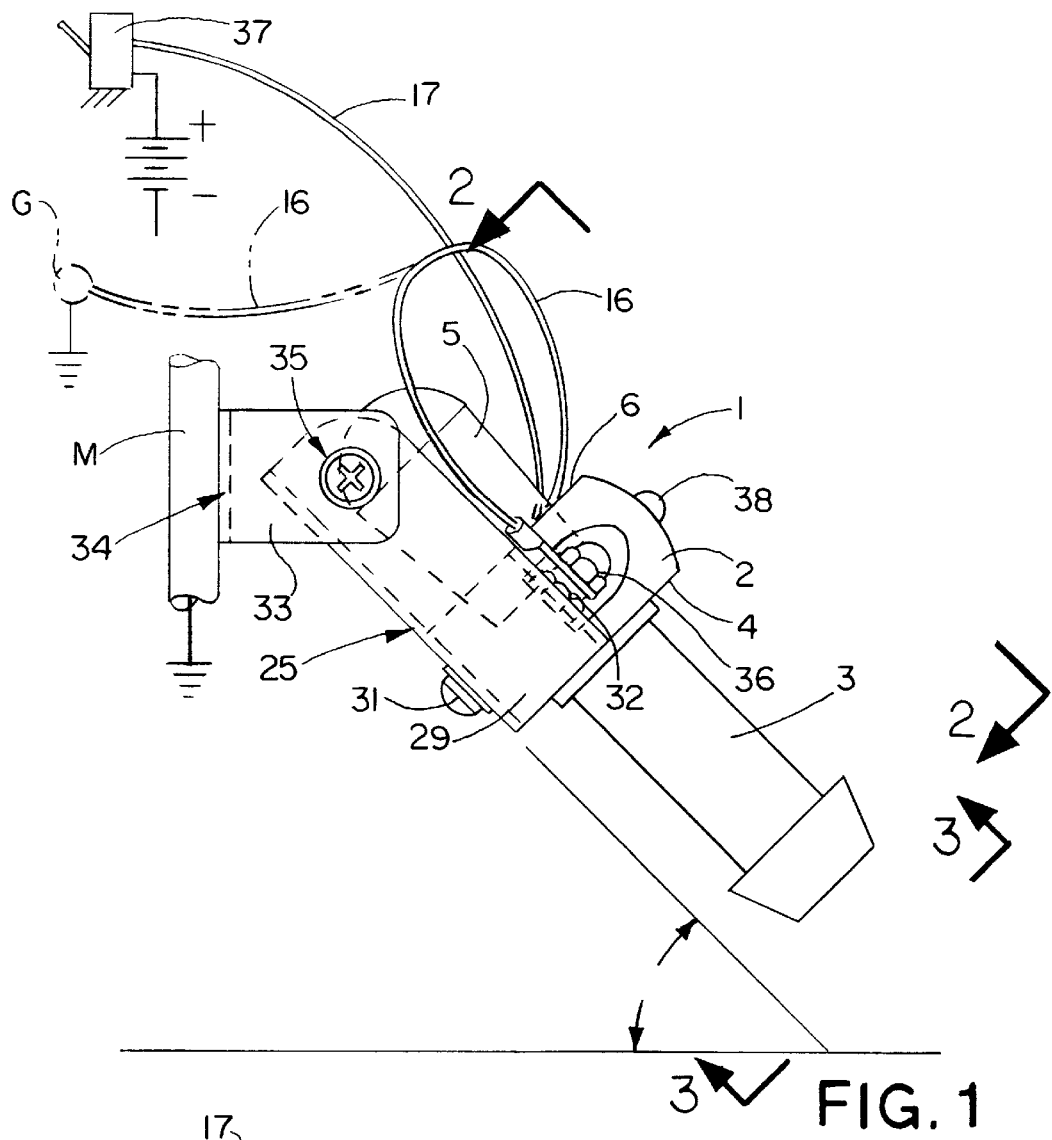
FIG. 1 is a schematic side elevation view of a preferred form of animal warning alarm device in accordance with this invention shown angled downwardly in a forward direction relative to a vehicle at an angle approximately 45° to the road surface.

Referring now in detail to the several figures of the drawing, there is shown a preferred form of animal warning alarm device 1 in accordance with this invention including a housing 2 having a hollow tube 3 projecting forwardly from the front wall 4 thereof and a cover 5 projecting rearwardly from the back wall 6 thereof. The housing 2 and tube 3 are desirably integrally molded as one piece out of a suitable plastic, whereas the cover 5 is desirably separately molded out of a suitable plastic to permit the sonic generator to be mounted in the device before the cover is secured in place as described hereafter.

Figure 4:
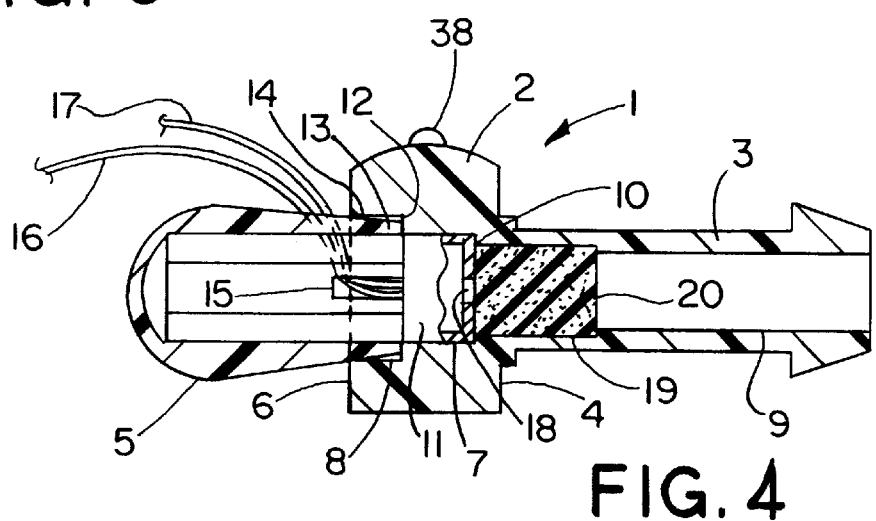
FIG. 4 is a fragmentary longitudinal section through the device of FIG. 2 taken generally along the plane of the line 4—4 thereof.

As clearly shown in FIG. 4, within the housing 2 are a pair of coaxial stepped bores 7 and 8. The forwardmost stepped bore 7 has a diameter somewhat greater than the diameter of the through passage 9 in the tube 3 to provide a radial shoulder 10 therebetween that acts as a stop for locating a sonic generator 11 in the forwardmost stepped bore when inserted from the rear and secured in place using a suitable adhesive or potting compound or the like. Further, the rearmost stepped bore 8 has a diameter somewhat greater than the diameter of the forwardmost stepped bore 7 to provide a radial shoulder 12 therebetween that acts as a stop limiting the extent of insertion of the open end 13 of the cover 5 into the rearmost stepped bore.

Preferably, the outer wall 14 of the cover 5 is tapered toward the open end 13 for ease of insertion of the open end into the rearmost stepped bore 8 and is secured in place using a suitable adhesive/solvent cement. In such outer wall 14 is a slot 15 (see FIG. 4) that extends from the open end rearwardly of the rear wall 6 of the housing 2 for passage of the power and ground leads 16, 17 from the sonic generator 11 exteriorly of the housing.

The sonic generator 11 has a forwardly facing sound discharge opening 18 in coaxial alignment with the passage 9 in the tube 3 which is preferably straight walled for channeling the sound wave passing through the tube. Intermediate the passage 9 in the tube 3 and forwardmost stepped bore 7 in the housing 2 is a chamber 19 having a diameter somewhat smaller than the diameter of the forwardmost stepped bore 7 and somewhat greater than the diameter of the through passage 9 in the tube for receipt of an acoustical foam layer 20 which covers the discharge opening 18 in the sonic generator 11 to dampen the sound waves emitted therefrom and keep any particles in the air from entering the sonic generator through the passage 9 and possibly causing damage thereto.

Although the dimensions of the device may vary, in a preferred embodiment of the present invention, the sound discharge opening 18 in the sonic generator 11 has a diameter of approximately one-eighth inch, and the passage 9 in tube 3 has a diameter of approximately three-eighths inch and an axial length of approximately one and three-eighths inch. The chamber 19 has a diameter of approximately seven-sixteenths inch and an axial length of approximately five-eighths inch, and the forwardmost stepped bore 7 has a diameter of approximately nine-sixteenth inch and an axial length of approximately three-eighths inch, and the rearmost stepped bore 8 has a diameter of approximately three-fourths inch and an axial length of approximately one-fourth inch. Also, the sonic generator 11 preferably is designed to operate within a voltage range of eight to sixteen volts direct current at an operating frequency of 4.8±0.5k Hz to produce an ultrasonic wave of 18,000 to 21,000 Hertz at a sound pressure level of 120 dB (AS).

It has been found that such a device will produce a semi-directional sonic wave that will carry in excess of 1,600 feet. Also, it has been found that when such a device is angled downwardly toward the road surface in a forward direction relative to the vehicle, the semi-directional sonic wave produced by the device will be reflected off the road surface and produce a virtual sonic echo effect that is very effective in alerting deer and most other animals of an approaching vehicle with sufficient warning to substantially reduce the risk of animal/vehicle collisions.

To achieve maximum effectiveness, the tube 3 should desirably be angled downwardly in a forward direction at an angle of approximately 45° to the road surface as schematically shown in FIG. 1. This causes the sound emitted from the device to be reflected off the road surface and produce different tones due to the different compositions of the road surface and the constantly changing distance between the device and the road surface due to the vibrations of the vehicle as the vehicle is driven along the road surface.

Figure 2:
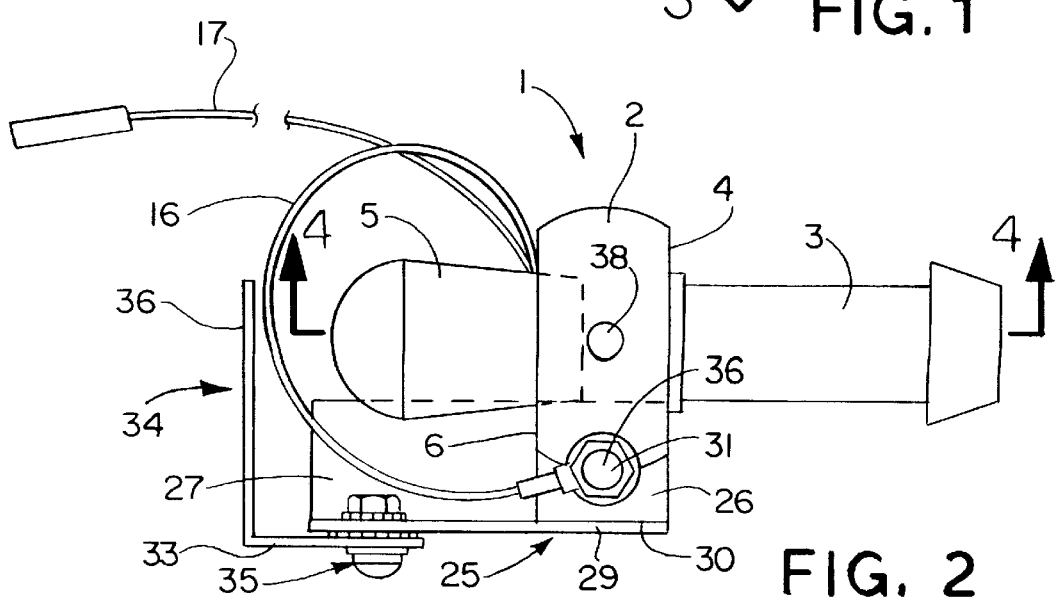
FIG. 2 is a top plan view of the device of FIG. 1 as seen from the plane of line 2—2 thereof.
Figure 3:
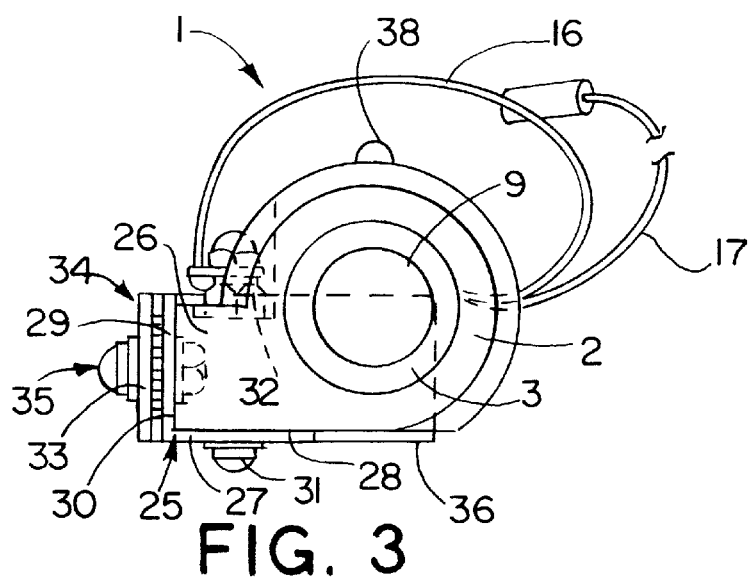
FIG. 3 is a front elevation view of the device of FIG. 1 as seen from the plane of the line 3—3 thereof.

To facilitate mounting of the device base 1 in the desired angular orientation on a vehicle, one end of an L-shaped base bracket 25 may be attached to a flange 26 on one side of the housing 2 by engaging one leg 27 of the base bracket with a flat bottom wall 28 on the flange and the other leg 29 with a flat side wall 30 of the flange extending at a right angle to the bottom wall, and inserting a bolt 31 upwardly through aligned holes in the bottom leg and flange and threading a nut 32 onto the upper end of the bolt protruding through the flange as schematically shown in FIGS. 1 through 3. The other end of the base bracket 25 extends rearwardly of the housing 2 for pivotal attachment of one leg 33 of an L-shaped mounting bracket 34 to the side leg 29 of the base bracket using a suitable fastener such as a nut and bolt and star washer assembly 35. The other leg 36 of the mounting bracket 34 extends at a right angle to the first leg rearwardly of the cover 5, and may have two or more mounting holes therein (not shown) for attaching the mounting bracket at a suitable location on the vehicle. For example, the mounting bracket may be attached behind the grill or on the chassis of the vehicle or other suitable location where the device 1 can be oriented with the tube facing forward in the normal direction of movement of the vehicle but angled downwardly, preferably at an angle of approximately 45° to the road surface, without any obstructions in front of the tube opening.

The holes in the mounting bracket 34 may be located over existing holes in the vehicle, or holes may be drilled in the vehicle in line with the holes in the mounting bracket to permit the mounting bracket to be secured in place using suitable screws, lug washers and nuts or self-tapping metal screws or other suitable fasteners as desired. Once installed, the device 1 can easily be adjusted to achieve the desired angular orientation relative to the road surface by loosening the nut and bolt connection 35 between the mounting bracket 34 and base bracket 25 and pivoting the device to the desired angular orientation and retightening the nut. Preferably the device is mounted so that it is approximately six inches to a foot off the road surface but could be as much as three feet off the road surface if desired.

When both the mounting and base brackets 34 and 25 are made of metal and the mounting bracket 34 is mounted on a metal surface M of the vehicle which is grounded as schematically shown in FIG. 1, the sonic generator 11 can be grounded simply by attaching the ground wire 16 to a terminal 36 formed by the upper end of the metal fastener 31 used to fasten the base bracket 25 to the housing. If the vehicle surface on which the device is mounted is not a vehicle ground, the ground wire 16 can be removed from the terminal 36 and attached to any suitable grounded surface G on the vehicle as depicted in phantom lines in FIG. 1.

The power lead 17 for the sonic generator 11 may be connected for example to a dash mounted control switch 37, also schematically shown in FIG. 1. Power to the control switch 37 may be provided by connecting the control switch to any fused circuit, such as the radio or parking lights of the vehicle, and may be made at the fuse block or under the dash as desired.

When installed, the device may be used at any time. However, since the high frequency sound wave that is generated by the device may be irritating to some people especially in cities and congested areas, the operator may only wish to use the device when driving in high risk areas and on open roads. If desired, an indicator light 38 such as a light emitting diode (LED) may be connected in parallel to the sonic generator circuit to alert the user when the device is operating.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. An animal warning alarm device mounted on a vehicle to warn animals of an approaching vehicle comprising a housing having a hollow tube projecting forwardly from said housing, an electronic sonic generator attached to said housing for producing a sonic wave that is channeled out through a forward open end of said tube, and means for attaching said device to the vehicle with the forward open end of said tube angled downwardly in a forward direction toward the road surface beneath the vehicle, whereby the sonic wave that is emitted from the tube will be reflected off the road surface and produce a virtual sonic echo effect.

2. The device of claim 1 wherein said tube is angled downwardly in a forward direction at an angle of approximately 45° to the road surface.

3. The device of claim 1 wherein said tube has a straight walled passage for channeling the sonic wave passing through said tube.

4. The device of claim 1 wherein said housing has a stepped bore in coaxial alignment with said tube, and said sonic generator is contained within said stepped bore.

5. The device of claim 4 wherein said stepped bore has a radial shoulder that acts as a stop for locating said sonic generator within said stepped bore.

6. The device of claim 4 wherein said housing has another stepped bore rearwardly of said stepped bore in which an open end of a cover is received.

7. The device of claim 6 further comprising a slot in an outer wall of said cover extending from said open end rearwardly of said housing, and lead wires extending from said sonic generator through said slot rearwardly of said housing.

8. The device of claim 4 wherein said sonic generator has a forwardly facing sound discharge opening in line with a longitudinal passage in said tube.

9. The device of claim 4 further comprising a chamber forwardly of said stepped bore containing an acoustical foam layer to prevent any particles in the air from passing through said tube into contact with said sonic generator.

10. The device of claim 1 wherein said means for attaching comprises a mounting bracket fixed to a mounting surface on said vehicle, and said housing has an adjustable pivotal connection with said mounting bracket to permit said housing to be pivoted up or down relative to said mounting bracket to adjust the downward angle of said tube relative to the road surface.

11. The device of claim 1 wherein said housing has a flange on one side, further comprising an L-shape base bracket having one leg engaging a flat bottom wall of said flange and another leg engaging a flat side wall of said flange extending at a right angle to said bottom wall, a bolt extending vertically upwardly through aligned holes in said one leg of said base bracket and said flange, and a nut threaded onto an upwardly protruding end of said bolt for securing said housing to said base bracket.

12. The device of claim 11 wherein said means for attaching comprises a mounting bracket having a first leg adjustably pivotally connected to said one leg of said base bracket rearwardly of said housing, and a second leg extending at a right angle to said first leg adapted to be attached to a mounting surface on said vehicle.

13. The device of claim 12 wherein said base bracket and said mounting bracket are made of metal, and said mounting bracket is attached to a metal surface of said vehicle which is grounded, and the upper end of said bolt provides a ground terminal for a ground wire coming off said sonic generator.

14. The device of claim 1 further comprising a ground wire having one end connected to said sonic generator and another end attached to a grounded surface on said vehicle, and a power lead having one end connected to said sonic generator and another end connected to a dash mounted control switch.

15. The device of claim 14 wherein said control switch is powered off a fused circuit of said vehicle.

16. An animal warning alarm device adapted to be mounted on a vehicle to warn animals of an approaching vehicle comprising a housing, a hollow tube projecting forwardly from said housing, an electronic sonic generator attached to said housing for producing a sonic wave that is channeled out through a forward open end of said tube, and a mounting bracket adapted to be attached to a vehicle, said housing having an adjustable pivotal connection with said mounting bracket to permit the forward open end of said tube to be angled downwardly in a forward direction toward the road surface beneath the vehicle.

17. The device of claim 16 wherein said housing and said tube are integrally molded out of plastic.

18. The device of claim 16 wherein said housing has a stepped bore in coaxial alignment with a longitudinal passage through said tube, and said sonic generator is contained within said stepped bore.

19. The device of claim 18 wherein said stepped bore has a radial shoulder that acts as a stop for locating said sonic generator within said stepped bore.

20. The device of claim 19 wherein said housing has another stepped bore rearwardly of said stepped bore in which an open end of a cover is received, said cover having an outer wall containing a slot extending from said open end rearwardly of said housing through which lead wires from said sonic generator extend rearwardly of said housing.

21. The device of claim 16 further comprising a chamber forwardly of said stepped bore containing an acoustical foam layer to prevent any particles in the air from passing through said tube into contact with said sonic generator.

22. The device of claim 16 wherein said tube has a straight walled passage for channeling the sonic wave passing through said tube.

* * * * *